(12) United States Patent
Glover et al.

(10) Patent No.: US 6,488,047 B1
(45) Date of Patent: Dec. 3, 2002

(54) EXCESS FLOW VALVE

(75) Inventors: Donald S. Glover, Birmingham, MI (US); James E. Scanlon, Novi, MI (US); Mark Koeroghlian, Austin, TX (US)

(73) Assignee: Brass Craft Manufacturing Company, Novi, MI (US)

( * ) Notice: Subject to any disclaimer, the term of this patent is extended or adjusted under 35 U.S.C. 154(b) by 0 days.

(21) Appl. No.: 09/894,491

(22) Filed: Jun. 28, 2001

(51) Int. Cl.[7] .......................... F16K 17/28; F16K 31/08
(52) U.S. Cl. ..................... 137/517; 137/460; 137/515.5; 251/65
(58) Field of Search ............................ 137/460, 515.5, 137/517; 251/65

(56) References Cited

U.S. PATENT DOCUMENTS

| | | |
|---|---|---|
| 2,569,316 A | 9/1951 | Jerman |
| 2,646,071 A | 7/1953 | Wagner |
| 2,949,931 A | 8/1960 | Ruppright |
| 3,468,338 A * | 9/1969 | Patterson ................ 137/517 |
| 3,921,662 A * | 11/1975 | Hauffe et al. ............. 251/65 |
| 4,872,012 A | 10/1989 | Chabries |
| 4,874,012 A | 10/1989 | Velie |
| 5,203,365 A | 4/1993 | Velie |

* cited by examiner

Primary Examiner—John Rivell
(74) Attorney, Agent, or Firm—Carlson, Gaskey & Olds

(57) ABSTRACT

A number of improved excess flow valves are disclosed wherein the flow around a magnet holding portion of the valve body is generally unrestricted to reduce the pressure drop across the valve. The valve is preferably also formed separately from its valve seat to reduce the complexity of the valve, and allow it to have less resistance to flow. The valve seat may be provided as a separate part, or may be provided in the conduit.

9 Claims, 4 Drawing Sheets

EXCESS FLOW VALVE

BACKGROUND OF THE INVENTION

This invention relates to excess flow valves for controlling flow through a conduit wherein the valve minimizes the pressure drop through the valve and also reduces the number of parts typically required.

Excess flow valves are utilized to limit the amount of fluid flow through a conduit. Generally, some way of holding the valve in a generally open position maintains the valve in an open position allowing flow through the conduit if the volume flow through the conduit is below predetermined limit. If the volume flow increases above the limit, or stated another way, if the pressure drop across the valve exceeds a certain value, then the valve is moved to a closed position restricting flow through the conduit.

One type of excess flow valve uses a magnet to hold the valve at a generally opened position. The typical prior art magnetic excess flow valve has been incorporated into a capsule, wherein the entire structure for providing a valve seat, a valve guide, and a magnet holder are all incorporated as a single capsule item.

Inevitably, the prior art has resulted in undesirably high pressure drop across the valve due to the high number of parts received in the flow path in this prior art type valve.

In addition, the prior art valves have had non-symmetric structure such that inadvertent resistance to flow has resulted due to variations in the orientation of the various valve components. This is undesirable.

SUMMARY OF THE INVENTION

In disclosed embodiments of this invention, a simplified excess flow valve is provided which results in a relatively small pressure drop across the valve assembly. This is achieved by reducing the number of parts, and eliminating restriction to flow through the conduit due to the valve assembly to the extent possible when the valve is open. In preferred embodiments, a first body portion incorporating a valve guide and a magnet holder is separate from the valve seat. In some embodiments the valve seat may be provided by a separate valve seat, and in other embodiments the valve seat is provided by a surface in one of the conduit halves.

In the second type of inventive embodiments, the valve is preferably mounted at a connection between two conduit portions, such that the valve seat may be provided at one of those two conduit portions. Moreover, there is less structure at the outer periphery of the valve to disrupt or otherwise provide a restriction to flow. Generally, the excess flow valves allow flow around the outer periphery of the valves when the valve is in its open position. The prior art has had structure in the way of the flow, which results in undesirably high pressure drop. The present invention incorporates its valve guiding function with a plurality of circumferentially spaced legs extending radially inwardly from a radially outer portion. This structure presents less of a restriction to flow than the prior art, which generally extends it along the entire circumference of the valve. With the present invention there is thus less disruption or other resistance to flow.

These and other features of the present invention can be best understood from the following specification and drawings, the following of which is a brief description.

DETAILED DESCRIPTION OF A PREFERRED EMBODIMENT

Figure 1:
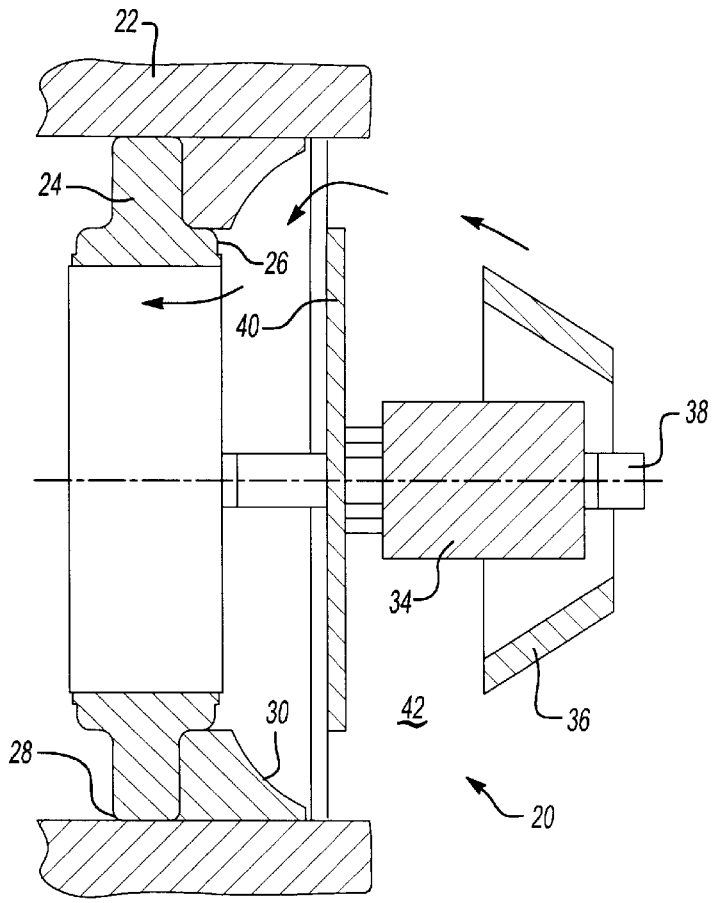
FIG. 1 is a cross-sectional view through a first embodiment of the present invention.
Figure 2:
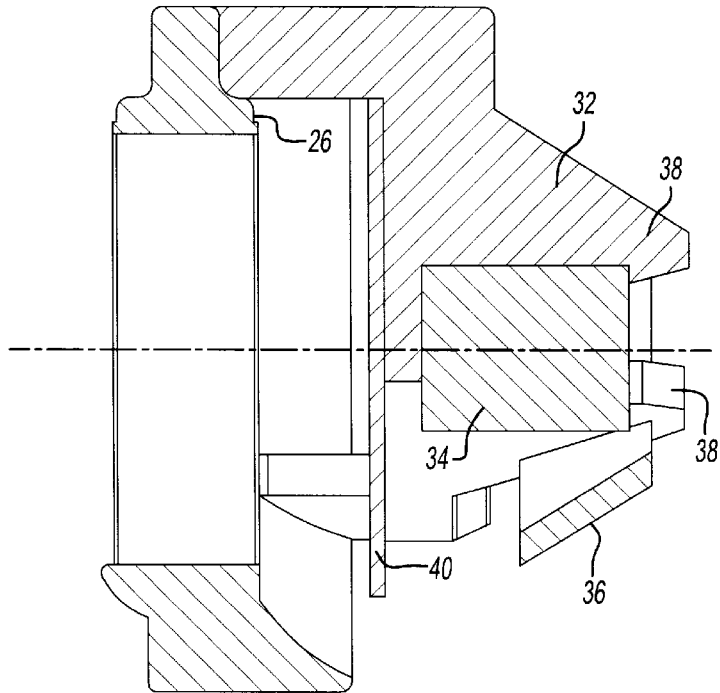
FIG. 2 shows a portion of the FIG. 1 valve taken in a direction generally spaced by 90° from the FIG. 1 cross-section.

As shown in FIG. 1, an excess flow valve 20 is positioned within a conduit 22. A first body portion 24 provides a valve seat at 26. The outer periphery 28 of the valve seat portion 24 engages the inner periphery of a conduit 22. A fluid guide portion 30 has a generally cylindrical portion also engaging the inner periphery of the conduit 20. Circumferentially spaced arms 32 (FIG. 2) extend inwardly. These arms hold a magnet 34. A frustro-conical web 36 connects the legs, and inner ends 38 clip the magnet 34. A disk valve 40 is movable inwardly of the legs and toward the valve seat 26. As can be seen, fluid can flow through an opening 42 generally around the entire circumference of the valve 40 except as blocked by 32. Preferably the valve is generally cylindrical such that it is symmetrical. In this way, there will be little or no variation in the resistance to flow through the passage 42, and the pressure drop across the valve will be minimized compared to the prior art. As shown in FIG. 2, the magnet 34 is held within each of the plurality of arms 32. As can be further appreciated from this view, the magnet 34 is also held by several clips 38.

Figure 3:
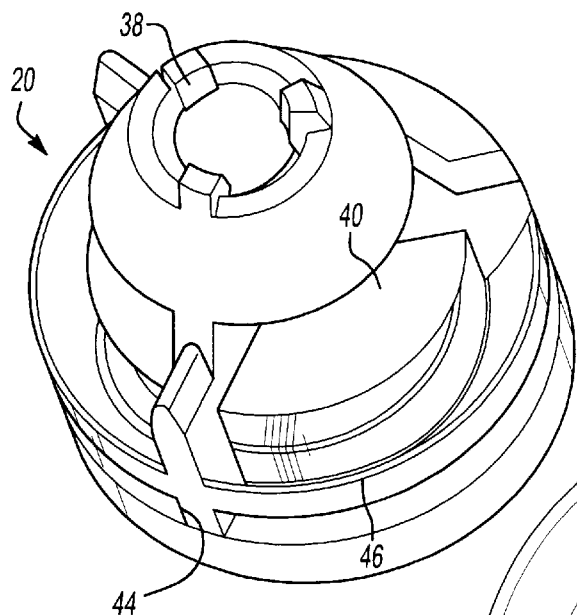
FIG. 3 is a perspective view of the FIG. 1 valve.

The valve 20 is illustrated in FIG. 3 in perspective view. As can be appreciated, the arms 32 have an outer peripheral portion 44 which contacts the inner periphery of the conduit 20. A further connecting portion 46 also contacts the inner periphery. The arms 32 extend radially inwardly to the frustro-conical web 36, and the magnet clips 38 are positioned spaced from the web 36. The valve plate 40 is guided by the arms, for movement toward and away from the valve seat.

Figure 4:
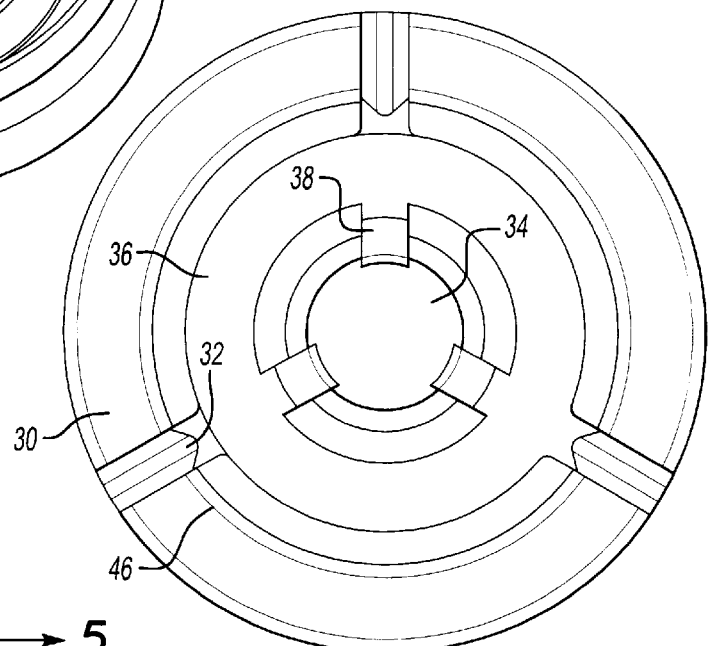
FIG. 4 is an end view of the FIG. 1 valve.

As shown in FIG. 4, the magnet is held by clips 38 each extending inwardly from frusto-conical web 36. The circumferentially spaced arms 32 present less resistance to flow through the passage 42 than did the prior art which circumferentially surrounded the valve. Further, by utilizing a separate valve seat the present invention provides a simple valve assembly.

Figure 7:
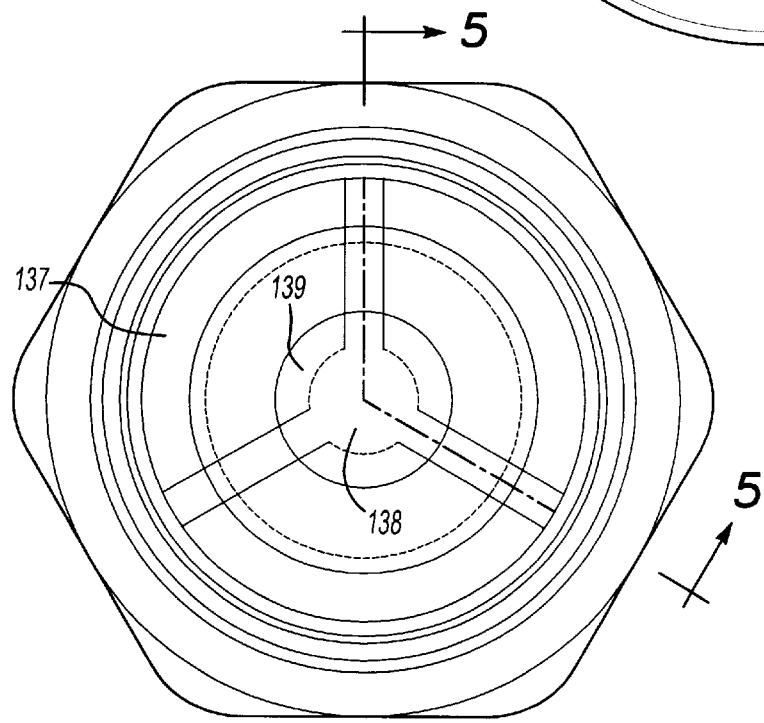
FIG. 7 is an end view of the FIG. 5 embodiment along line B—B.
Figure 5:
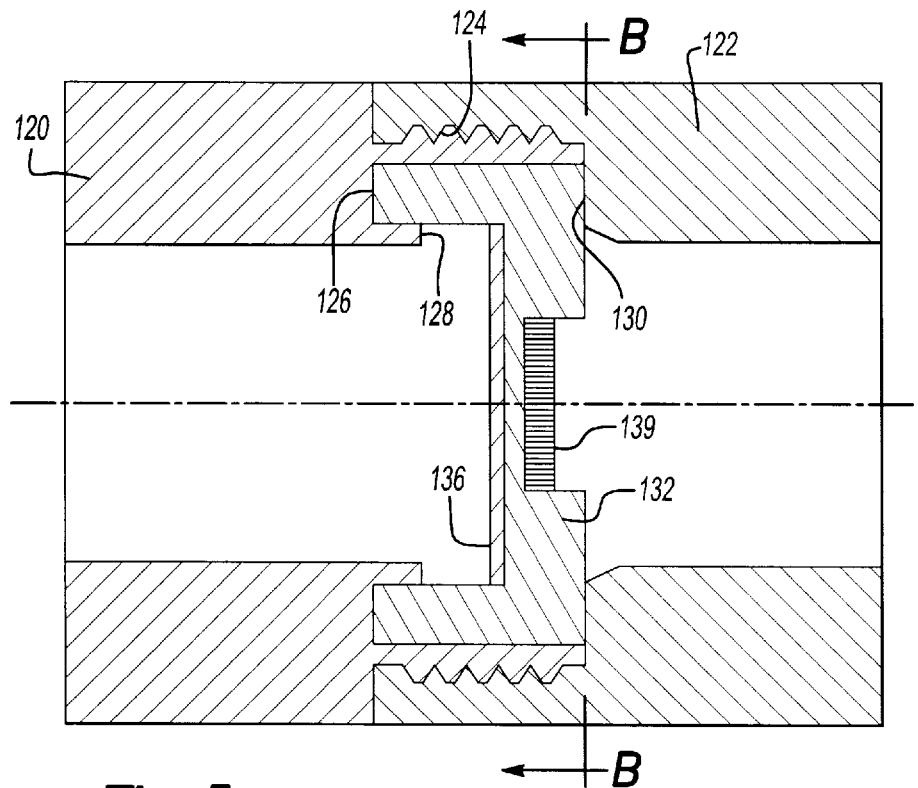
FIG. 5 shows another embodiment of the present invention.
Figure 6:
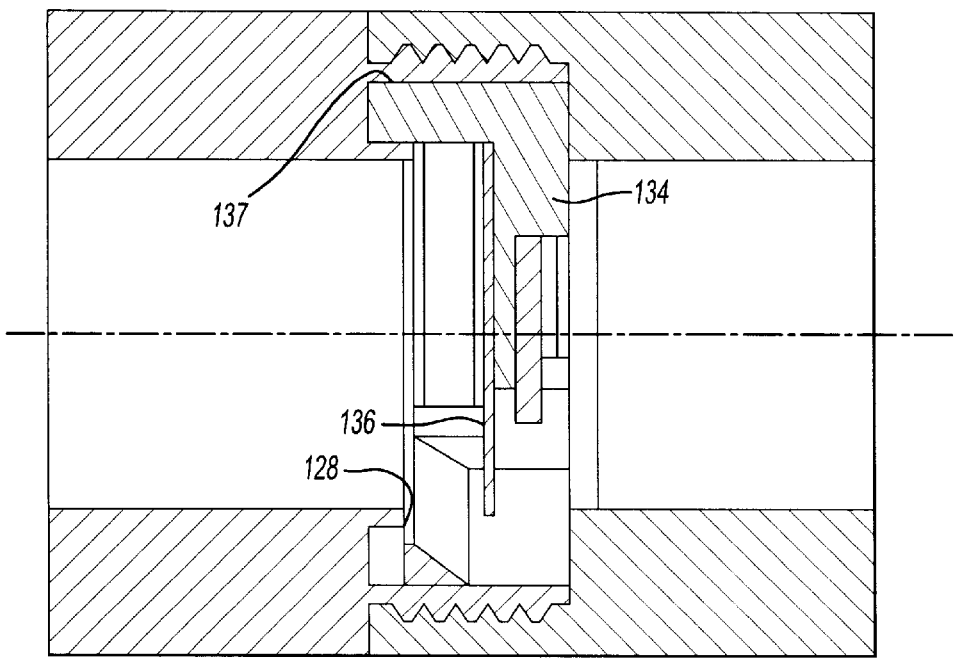
FIG. 6 is a cross-sectional view of the FIG. 5 embodiment.

FIG. 5 shows another embodiment taken along 5—5 as shown in FIG. 7. In FIG. 5, the conduit is shown to be a two-part conduit 120 and 122. A threaded connection 124 is formed between the two conduit portions while a recess 126 is formed into the face of one of the conduit portions. A valve seat 128 is provided radially inwardly of the recess. An opposed end surface 130 of the other conduit half 122 captures a valve assembly 132. While the valve assembly 132 is shown axially captured, the outer periphery of the valve body 132 could also be formed to be an interference fit within the conduit 120, and such that the conduit body 122 need not be positioned at any particular axial location relative to the conduit 120. The valve body 132 holds a magnet 139 adjacent a valve plate 136. As shown in FIG. 6, the body 132 does not have arm portions 134 around its entire circumference. Instead, as is the case with the prior embodiment, the arms 134 are circumferentially spaced. An outer portion 137 is received between the conduit halves 120 and 122.

FIG. 7 is a view looking from the right hand side toward the left of FIG. 5. Shown in FIG. 7, the valve is positioned aligned with a central cylindrical web 138, which is preferably a relatively small diameter compared to the valve plate 136.

Figure 8:
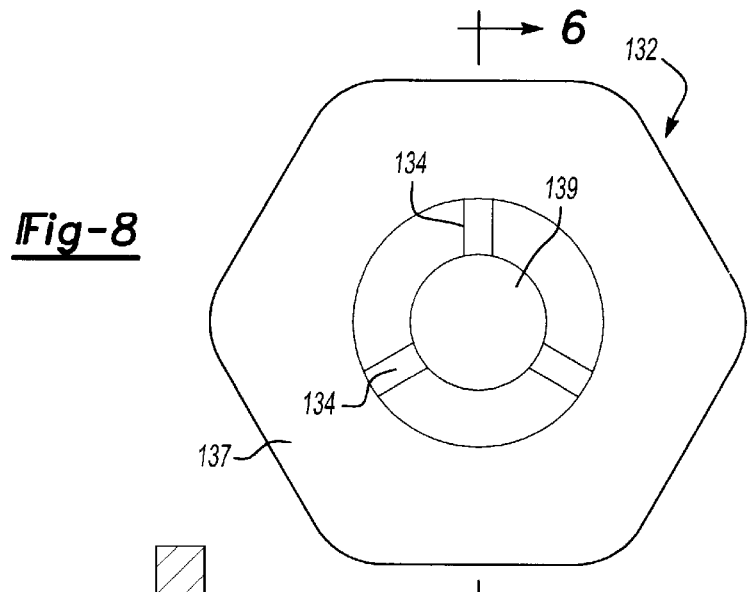
FIG. 8 is an end view spaced from the FIG. 6 cross-sectional view.

FIG. 8 shows the valve assembly 132, and the arms 134 extending to the magnet 139. This view is from the right looking to the left.

Figure 9:
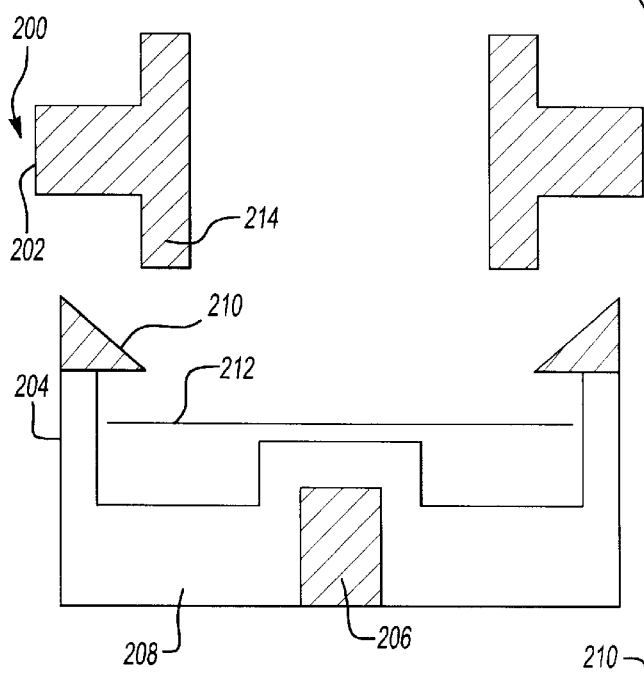
FIG. 9 is an end view of another valve.
Figure 10:
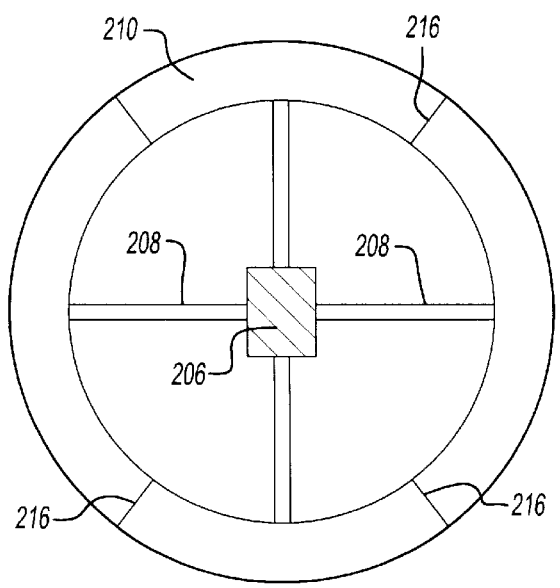
FIG. 10 is another end view of the FIG. 9 valve.

FIG. 9 shows yet another embodiment 200. In embodiment 200 a separate valve seat 202 is provided along with a separate valve guide and magnet holder portion 204. The magnet 206 is received in a space provided by several circumferentially spaced arms 208. A plate retainer structure 210 is provided at the forward end of the valve guide. The plate 212 moves forwardly and selectively seats against a valve seat 214, when the valve seat is positioned to extend radially inwardly of the plate retainer 210. As shown in FIG. 10, there may be cut portions 216 circumferentially spaced around the portion 204 of the valve retainer body 200. These portions will facilitate the clipping movement of the plate 212 inwardly of the plate retainer portions 210.

Although preferred embodiments of this invention have been disclosed, a worker in this art would recognize that certain modifications would come within the scope of this invention. For that reason the following claims should be studied the true scope and content of this invention.

What is claimed is:

1. An excess flow valve comprising:
    a body for guiding a plate, and for holding a magnet, said body having a plurality of radially inwardly extending arms extending from an outer securement portion to be secured within the inner periphery of a conduit, said body defining a magnet holding portion at a radially inner extent, and said arms further guiding a valve plate, said valve plate being normally biased toward said magnet, but being movable away from said magnet should the flow through said valve increase beyond a predetermined amount.

2. A valve as set forth in claim 1, wherein an outer periphery of said valve is spaced away from an inner periphery of the conduit when said valve is positioned in a conduit.

3. A valve as set forth in claim 1, wherein a separate valve seat is associated with said valve body, and is also to be positioned in a conduit with said valve body.

4. A valve as set forth in claim 1, wherein the conduit surrounding said valve provides a valve seat for abutting said valve plate.

5. A valve as recited in claim 1, wherein said magnet is held at a generally radially central position, said arms extending to a frusto-conical portion, with clip portions for holding said magnet in a magnet recess.

6. A valve as set forth in claim 1, wherein a separate valve seat is associated with said valve body, said valve body abutting a portion of said valve seat to properly position said plate relative to said valve seat.

7. A valve as set forth in claim 6, wherein said valve body radially surrounds said valve seat.

8. A conduit including an excess flow valve comprising:
    a conduit;
    a body in said conduit for guiding a plate, and for holding a magnet, said body having a plurality of radially inwardly extending arms extending from an outer securement portion to be secured within the inner periphery of said conduit, said body defining a magnet holding portion at a radially inner extent, and said arms further guiding a valve plate, said valve plate being normally biased toward said magnet, but being movable away from said magnet should the flow through said valve increase beyond a predetermined amount; and
    a valve seat, said conduit surrounding said valve seat and said valve body.

9. A conduit as recited in claim 8, wherein said valve seat is formed to be separate from both said valve body and said conduit.

* * * * *